United States Patent
Fisher et al.

(10) Patent No.: US 8,234,384 B2
(45) Date of Patent: Jul. 31, 2012

(54) COMPUTER SYSTEMS AND METHODS FOR PROCESS CONTROL ENVIRONMENTS

(75) Inventors: Mark Fisher, Milton Keynes (GB); Mark Freeman, Towcester (GB)

(73) Assignee: Jemmac Software Limited, Cranford (GB)

( * ) Notice: Subject to any disclaimer, the term of this patent is extended or adjusted under 35 U.S.C. 154(b) by 1268 days.

(21) Appl. No.: 11/598,307

(22) Filed: Nov. 13, 2006

(65) Prior Publication Data

US 2008/0114872 A1 May 15, 2008

(51) Int. Cl.
*G06F 15/16* (2006.01)
*G06F 11/00* (2006.01)
*G06F 11/20* (2006.01)

(52) U.S. Cl. ........ 709/227; 709/223; 709/202; 709/206; 709/207; 714/4; 370/338

(58) Field of Classification Search .................. 709/318, 709/223, 202; 719/318; 714/4
See application file for complete search history.

(56) References Cited

U.S. PATENT DOCUMENTS

| | | | |
|---|---|---|---|
| 7,017,116 B2* | 3/2006 | Elsbree et al. | 715/740 |
| 7,039,827 B2* | 5/2006 | Meyer et al. | 714/4.11 |
| 7,496,668 B2* | 2/2009 | Hawkinson et al. | 709/227 |
| 2003/0144746 A1* | 7/2003 | Hsiung et al. | 700/28 |
| 2004/0006624 A1* | 1/2004 | Hawkinson et al. | 709/227 |
| 2004/0006652 A1* | 1/2004 | Prall et al. | 709/318 |
| 2005/0028024 A1* | 2/2005 | Kataoka et al. | 714/4 |
| 2007/0112446 A1* | 5/2007 | Deveaux et al. | 700/83 |

* cited by examiner

*Primary Examiner* — Asad M Nawaz
*Assistant Examiner* — Jason Harley

(57) ABSTRACT

This invention generally relates to computer systems and architectures, methods and computer program code for increasing the robustness of process control and manufacturing automation systems and the like, in particular to provide improved handling of error and/or failure conditions. We describe an architecture for an OPC Failover system, the architecture comprising: a plurality of OPC servers; at least one OPC client; a computer network linking said OPC servers and said OPC client; and an OPC Failover service coupled to said network and not coupled between said OPC client and said OPC servers, said OPC Failover service being configured to monitor at least one of said OPC servers for an error condition and to redirect network communications of said OPC client from one of said servers to another on detection of said error condition.

12 Claims, 5 Drawing Sheets

COMPUTER SYSTEMS AND METHODS FOR PROCESS CONTROL ENVIRONMENTS

FIELD OF THE INVENTION

This invention generally relates to computer systems and architectures, methods and computer program code for increasing the robustness of process control and manufacturing automation systems and the like, in particular to provide improved handling of error and/or failure conditions.

BACKGROUND TO THE INVENTION

In this specification we will refer specifically to OPC (OLE—object linking and embedding—for Process Control) systems since these have become a de facto standard. However the skilled person will recognise that the techniques we describe are not limited to such systems.

Broadly speaking OPC systems tend to be implemented where there is a need for continuous or batch process control, for example in a chemical manufacturing plant. Typically there are many sensors and actuators/control devices, for example temperature sensors, valves, blowers and the like. These transducers are coupled into one or more networks, to which are also coupled one or more OPC servers which provide an interface to the transducers. Generally a model of the process runs as a separate application either on the same or a different node to the server. Such a model may provide overall control of the manufacturing process, for example to control and optimise efficiency which, in the large scale processes of the type described here, can be economically very important. The model may be implemented using an OPC client, although OPC clients may also be used for other purposes—for example some OPC clients are read-only reporting tools.

Historically proprietary technology was employed to provide an interface to each industrial device or transducer but more recently a distributed client-server architecture has developed which uses a set of de facto standards developed by the OPC Foundation to interface between data access servers and clients. Thus an OPC server will provide one or more sets of APIs (Application Program Interfaces), each set of APIs comprising some which must be supported and some which are optional. OPC certification that a server or client complies with these is also available. Current and emerging OPC specifications include OPC Data Access (currently at version 3); OPC Alarms and Events; OPC Batch; OPC Data eXchange; OPC Historical Data Access; OPC Security; and OPC XML-DA. There is also a plan for OPC UA (Unified Architecture), that is a single specification to encompass some or all of the above specifications. The OPC interfaces conceal the underlying complexity, for example the precise form of network communications, and OPC itself generally (apart from XLM-DA and UA) uses the Windows DCOM (Distributed Component Object Model).

We have described features of the OPC specification above because they are helpful for understanding the operation of embodiments of the invention. However the skilled person will appreciate from the later description that embodiments of the invention do not rely upon any particular form of the OPC specification. More particularly it will be seen that one of the advantages of embodiments of the invention is that they are independent of any particular OPC API set.

Commonly a manufacturing or industrial process control system operates in a complex and distributed computing environment and there are many events which can compromise access to OPC data. Computer or network hardware can fail and hardware and software may need to be upgraded—for example frequently a node may need to be rebooted following installation of a Windows™ security update. However it is also important to keep down time of the system to a minimum and, in particular, to provide for failure of an OPC server.

FIG. 1 shows an example of a proxy OPC server design architecture with a pair of OPC servers 10a, 10b coupled to an OPC client 14 by means of a proxy OPC server 16, to enable failover from one OPC server to another in the event of failure. The proxy server 16 runs on the OPC client node, and the OPC client connects to the proxy server which in turn directs the OPC data transaction to one of the two real OPC servers 10a,b. This architecture offers the possibility of a seamless, no data loss OPC transaction during failure of an OPC server but this comes at a cost: the proxy OPC server is a complex entity that has to be kept up to date and that has to fully implement all required and optional OPC interfaces; the architecture complicates and potentially compromises the complex DCOM security configuration; and the proxy server can also reduce performance of the client transaction and potentially increase the load on the underlying data source by getting both the underlying OPC servers to process the OPC transaction. Moreover although the architecture of FIG. 1 provides redundant servers it itself introduces a new single point of failure, that is the proxy server 16, and if the proxy server fails the OPC client cannot access OPC data.

Further background material can be found in US2004/0006624.

There is therefore a need for improved techniques for adding redundancy to a manufacturing or industrial process control system such as an OPC system.

SUMMARY OF THE INVENTION

According to a first aspect of the invention there is therefore provided an architecture for an OPC Failover system, the architecture comprising: a plurality of OPC servers; at least one OPC client; a computer network linking said OPC servers and said OPC client; and an OPC Failover service coupled to said network and not coupled between said OPC client and said OPC servers, said OPC Failover service being configured to monitor at least one of said OPC servers for an error condition and to redirect network communications of said OPC client from one of said servers to another on detection of said error condition.

In embodiments at least the OPC server to which the client is currently connected is monitored although preferably a plurality or all of the OPC servers to which the OPC client may connect are monitored. In some particularly preferred embodiments the redirection comprises modifying an object identifier or address indirection in a registry or Implementation Repository of an operating system of the client. In this way, rather than the OPC Failover service acting between the client and server to connect the client to a different server when a failure is detected, the failover service instead allows the client to see the error or failure of the server, in embodiments then relying on the client to in effect to "redial", but since the relevant operating system entry has been modified prior to the redialling, when the client redials what it thinks is the same server it in fact is connected to a different server, preferably one which has previously been established to be operational. (The skilled person will therefore appreciate that embodiments of the invention do not reroute network traffic on the fly).

Thus in preferred embodiments of the architecture the failover service is configured to allow the client to detect the error condition and the client is configured to attempt reconnection on detection of this error. It will be appreciated that in embodiments of such an architecture the communications error is seen by the client (i.e. is non-transparent to the OPC client), but the communication redirection of the failover service is preferably substantially transparent to the OPC client. Moreover the client should attempt reconnection to an OPC server when a communication problem is detected—although in practice this is almost ubiquitous. Further preferably the OPC client and OPC Failover service are implemented in the same "box" or on the same node—that is in embodiments they are implemented on computer hardware with a shared or common connection network.

In an OPC Failover system as currently specified a Windows™ DCOM communications infrastructure is employed, and thus the OPC client is coupled to the OPC server by a DCOM link. Thus in some currently preferred embodiments the OPC Failover service is configured to modify this link to redirect the network communications. In the DCOM system address indirection is employed to associate a name of a resource or method, referred to as the ProgID with an identifier or address for the resource referred to as the CLSID. In the DCOM architecture this address may comprise a TCP/IP address. Generally, but not always, the CLSID uniquely identifies the resource (process/method/object); the mapping of the ProgID to CLSID is stored in the registry. When a client wishes to access a server resource (object/process/method) it performs a Windows call using the "friendly" ProgID to look up the CLSID, which it can then use in (say) a CoCreateInstance( ) call to activate the server resource.

Hitherto there has been a prejudice in the art against modifying registry entries to achieve a desired result. However the inventors have appreciated that an improved OPC Failover technique may be implemented by altering the CLSID associated with a ProgID for a server object for a client so that instead of pointing to a failed server it points to an operational server, allowing the client to re-establish a connection to the operational server by allowing the failure to be detected so that the client performs another lookup of the CLSID (now different) for the same ProgID. (The CLSID need not be unique, but if it is not then it should not identify a server on the same node as the client).

In some preferred embodiments the architecture also includes an OPC Failover management module to enable the user to set up a failover group, in particular by defining a name of the failover group as a ProgID and by then enabling the user to associate CLSIDs for each OPC server in the group with the group ProgID.

In some preferred embodiments the OPC Failover service monitors all of the OPC servers in a failover group and if a fault is detected rewrites the registry entry to change the CLSID associated with the ProgID for the failover group. This is performed independently of the operation of the client so that, for example, the failover service does not, in embodiments, monitor the client connection to the server to determine whether or not the client (or any of several potential clients) is using it or to determine what the client is doing. Instead in preferred embodiments the failover service periodically polls the server currently identified by the CLSID of the group, for example at an interval of between one second and ten minutes (in other embodiments each server of the group may be polled). If the connection to the server succeeds then no further action is required; if the connection fails then the service finds another server in the group to connect to and replaces the CLSID with the CLSID of this server. Although there should be at least two OPC servers in the failover group, the architecture also allow for more than two real OPC servers in a group.

Embodiments of the architecture also enable the use of multiple failover groups. For example for historical reasons in a large manufacturing plant there may be multiple distributed control systems (DCS) and thus each DCS may have a separate ProgID, for example DCS1, DCS2 and so forth, each with a separate group of multiple redundant servers identified by separate, preferably unique, CLSIDs. (The CLSIDs do not need to be unique, they just need to not reside on the same node).

It will be appreciated that embodiments of the above-described architecture offer a number of advantages over a proxy server based approach. For example, in embodiments of the architecture the OPC Failover service can be switched off without effecting the operation of the OPC system (except in so far as failover is concerned) whereas by contrast in the arrangement of FIG. 1 if the OPC proxy server 16 is switched off the OPC system fails. The OPC Failover service and the graphical user interface provided by the OPC Failover manager, which in preferred embodiments writes configuration data into the registry for the OPC Failover service to read, may operate independently of one another and of the client-server communications, for example without snooping on the client-server communications.

The preferred embodiments of the system described later are described with specific reference to the DCOM communications employed by OPC system in its current form. However implementation of embodiments of the invention are not limited to DCOM technology and may also employ, for example, ActiveX technology (again using DCOM, that is ProgID and CLSID); CORBA (Common Object Request Broker Architecture)—in which a named implementation of a server object is mapped to a name or object reference in the Implementation Repository—for example IBM's DSOM (Distributed System Object Model); and Java RMI (Remote Method Invocation), in which a named server resource (object/method) is generally mapped to a URL or string for the resource on the remote server in the registry.

The invention also provides a manufacturing or industrial plant control system employing an OPC Failover architecture as described above.

In another aspect the invention provides a method of providing a failover service for a manufacturing or industrial process control network, said network including a plurality of process control servers and at least one process control client, said process control client being coupled to a selected process control server, the method comprising: detecting a failure of said selected process control server; reconfiguring a communications link between said process control client and said selected server to point to a different said process control server; allowing said process control client to detect said failure such that said process control client attempts to reconnect to said selected server; and wherein said reconnection attempt is directed to said different server by said reconfiguring of said communications link.

In preferred embodiments of the method the process control server is specified by a name and the reconfiguring comprises changing an identifier associated with the name from an identifier identifying the selected process control server to an identifier identifying the different process control server. Preferably the name and identifier comprise entries in a registry or repository of an operating system for the client, in particular ProgID and CLSID entries in a DCOM communications system.

The invention further provides a carrier medium carrying computer readable instructions to implement a method as described above.

The carrier may comprise a disc, CD- or DVD-Rom, program memory such as read only memory (firmware), volatile or non-volatile random access memory (RAM), or the like, but the carrier does not comprise pure electromagnetic signals. Code (and/or data) to implement embodiments of the invention may comprise source, object or executable code in a conventional programming language (interpreted or compiled) such as, for example, C or a variant thereof.

Thus in a further aspect the invention provides a carrier medium carrying computer readable instructions for controlling a computer system to provide a failover service for a process control network, the process control network including a plurality of process control servers and at least one process control client, said process control client being coupled to a selected process control server; the computer system including an operating system for said process control client to provide a network communications capability to enable said process control client to communicate across said network with a said process control server, and wherein said operating system includes an object identifier entry in a registry or repository of said operating system to link a name of an entity coupled to said network to an identifier of said entity in said network; and wherein said instructions comprise instructions for controlling the computer system to: read data identifying a group of said process control servers to which said process control client may connect, each server of said group of servers sharing a name for use by said client, said object identifier entry including an identifier for said selected server linked to said shared name; periodically test said selected process control server for an error condition; write updated data into said operating system registry or repository entry in response to detection of said error condition, said updated data comprising an identifier for a different server to said selected server to replace said identifier for said selected server in said registry or repository entry.

In some preferred embodiments the instructions further comprise instructions for managing a failover group, in particular to write configuration information into the registry.

In embodiments the periodic testing of the server may determine that an error condition is present if the server is non-responsive, for example optionally after a re-try. The selected replacement server comprises a server selected from the group (a user-defined OPC Failover Group); optionally the code may maintain a record of functioning servers and their connections by testing the servers within this group.

In a still further aspect the invention provides a method of providing a failover service for a client server system, said client server system comprising at least one client and a plurality of servers, each coupled to a network, said client and said servers being configured to communicate across said network using a distributed object model, the method comprising rewriting a registry or repository entry of an operating system for said client on detection of failure of a said server such that said entry identifies a different one of said servers.

Preferably the distributed object model comprises DCOM, although alternative communications mechanisms may be employed, for example ActiveX, CORBA, for example DSOM, and RMI. It will be appreciated, however, that in all these cases the modification (rewriting) is at a level of the system below that at which the client normally interacts with the address (object identification) table or data, embodiments of the method dynamically altering the addressing or object identification mechanism at this lower address or object identification indirection level.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
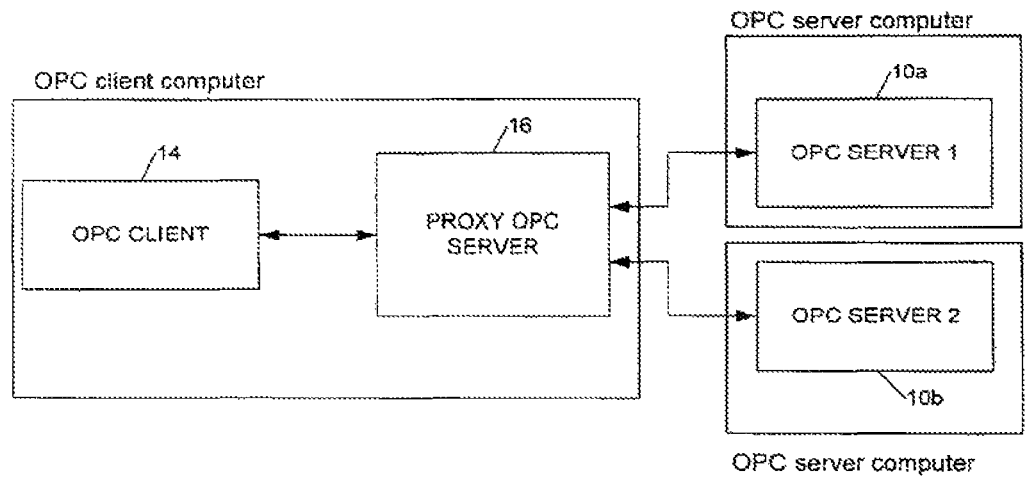
FIGS. 1a and 1b show, respectively, an example of a proxy OPC server design architecture, and an example of an OPC Failover architecture according to an embodiment of the present invention.
Figure 1B:
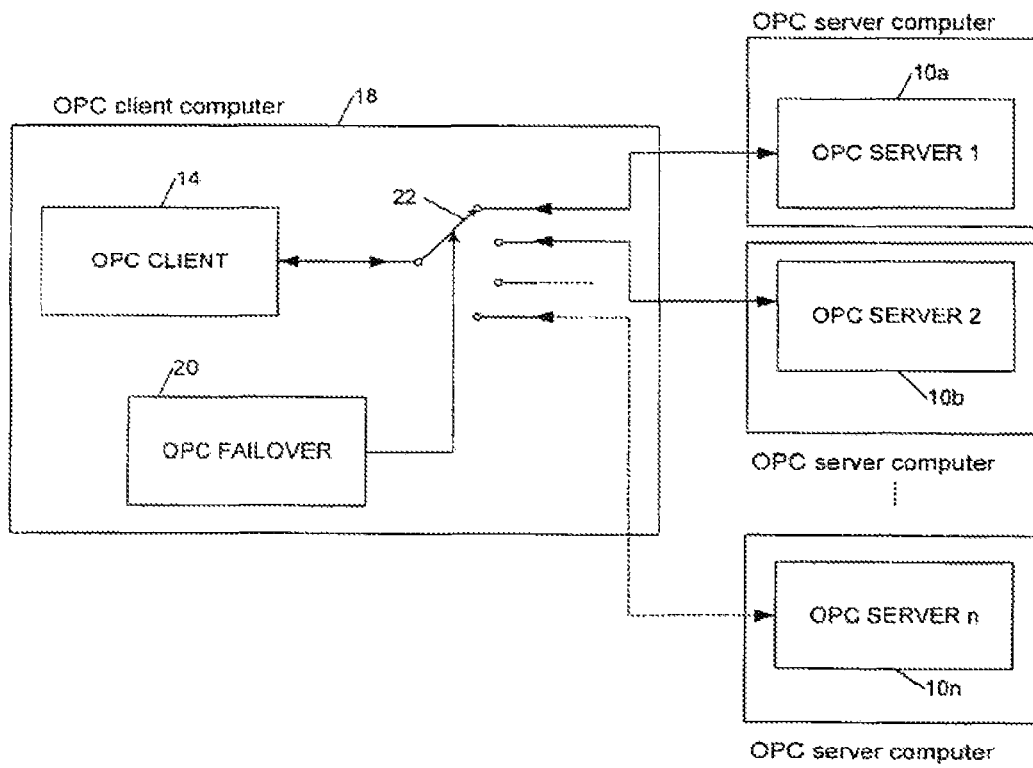

Referring to FIG. 1b this shows an example of an OPC Failover architecture 100 according to an embodiment of the present invention, in which like elements to those discussed previously are indicated by like reference numerals. The failover architecture may incorporate n>2 OPC servers, such as OPC server 10n. An OPC Failover process 20 runs in the client computer 18, controlling a "virtual switch" 22 connecting the OPC client selectively to one of the OPC servers 10. The operation of the "virtual switch" 22 is described further below. It can be seen that, unlike the proxy of FIG. 1a, the OPC Failover process 20 is not located in between the client and servers.

The OPC Failover software 20 is installed on the OPC client node 18 and manages the real-time reconfiguration of a new local OPC Server registration such that it always points to one of a set of real OPC Servers 10. An OPC client 14 that uses these new local OPC Server registration details will find they connect to different OPC Servers 10 depending on their availability.

In operation the OPC Failover process 20 manages Failover Groups—each of which comprises a list of one or more OPC servers along with a user specified Failover strategy. OPC Failover then presents the details of one OPC server from the Failover Group to the OPCClient, which then connects directly to the OPC server in question.

The OPC Failover process 20 monitors the availability of all the real OPC servers 10 in the Failover Group and ensures that the OPC server presented to the OPCClient is always healthy. All the OPCClient has to do is to communicate with the presented OPC server. In embodiments there are no other changes required in the OPCClient or the OPC servers. An embodiment of this architecture may be independent of the OPC server type, version, or vendor and can even work with OPC servers that are not yet available.

In embodiments the OPC server mapping maintained by OPC Failover ensures that the OPC Clients always connects and communicate directly with a real OPC server, just as they would normally do. In embodiments there are substantially no performance issues, no DCOM security complications, no new single point of failure.

When an OPCClient detects a problem in communication with an OPC server it will usually attempt to reconnect to the OPC server. If the reconnect attempt is to an OPC server presented to the OPCClient by OPC Failover a successful re-connection will take place and the OPCClient will be unaware that it has connected to an alternative healthy OPC server. The OPCClient is responsible for managing any data loss that may have occurred. The inventors have determined that OPC Clients generally have this capability.

OPC Failover is installed as a Service on the OPCClient node and can manage OPC server groups for any number of OPC Clients that are running on that node. There is no limit to the number of OPC server groups that OPC Failover can manage and each OPC server group can contain as many real OPC servers as desired. An OPC Failover Manager application is used to configure and monitor the OPC Failover Service and the OPC server groups it is responsible for.

To implement the system the data source (for example a DCS—distributed control system) should be accessible from at least two OPC Servers on the same network as the OPC Client. The OPC Failover Manager is then used to create a failover group that contains all of these real OPC Servers. The OPC Client is then reconfigured to use the ProgID that references the failover group. When the OPC Client performs a connect it will connect to the currently active OPC Server listed within the failover group. If the OPC Client detects a communication problem it attempts to reconnect to the same failover group ProgID, but the CLSID is modified by the failover service to point to a backup server. Any OPC client that simply uses a ProgID (a human readable server name) can work with OPC Failover. OPC is built upon Microsoft DCOM and the default way for a DCOM (or OPC) client to connect to a DCOM (or OPC) server is via a ProgID which DCOM, through a one or more registry (CLSID) lookups, resolves to identify the target server.

Figure 2:
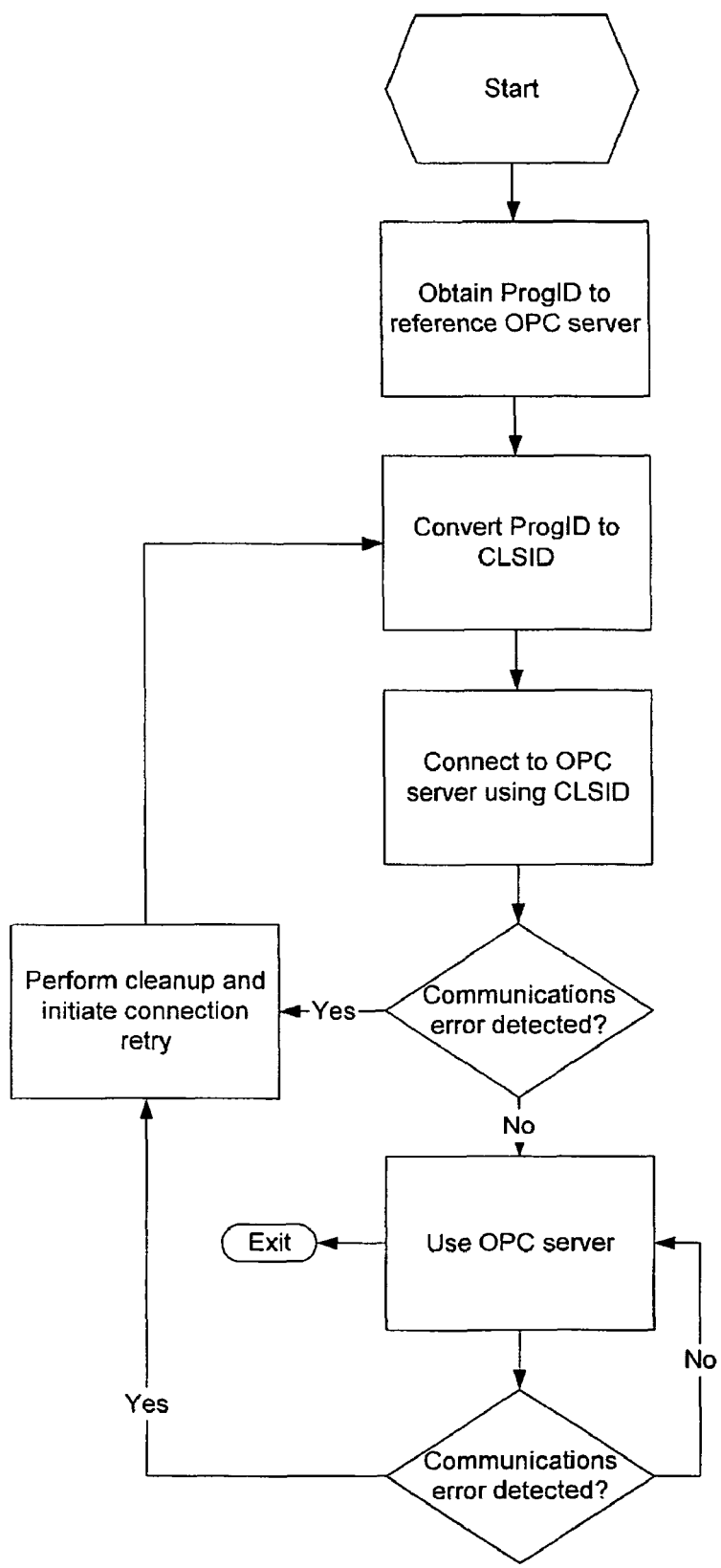
FIG. 2 shows a flow diagram of an OPC client process.

Referring now to FIG. 2, this shows a flow diagram of an OPC client process. Referring to the labelling of the steps in FIG. 2, the process operates as follows:

Start: The OPC client process begins execution

Obtain ProgID to reference OPC server: The OPC client establishes the ProgID of the OPC server it will attempt to connect to. This is implementation specific and generally is obtained from the OPC client configuration data set.

Convert ProgID to CLSID: The OPC client calls the standard Microsoft Windows™ API CLSIDFromProgID( ) and obtains the CLSID currently associated with the given ProgID.

This step is important. The OPC Failover service will have modified some Microsoft Registry data such that the CLSID returned may not be the same as that which was returned previously, and now references a currently available OPC server.

Connect to the OPC server using the CLSID: The OPC client calls the standard Microsoft Windows API CoCreateInstance( ) or CoCreateInstanceEx( ) to obtain a handle to the OPC server.

Communications error detected?: The OPC client examines the return status after each attempted communication with the OPC server. Those statuses that indicate a communications problem are trapped.

Use OPC server: The OPC client interacts with the OPC server as required to perform its required functionality.

Communications error detected?: The OPC client examines the return status after each attempted communication with the OPC server. Those statuses that indicate a communications problem are trapped.

Perform cleanup and initiate connection retry: The OPC client has established that it has lost connection to the OPC server. It typically performs some resource cleanup, resets state to 'initializing' and pauses for a short time before attempting to re establish connection to the OPC server.

Figure 3:
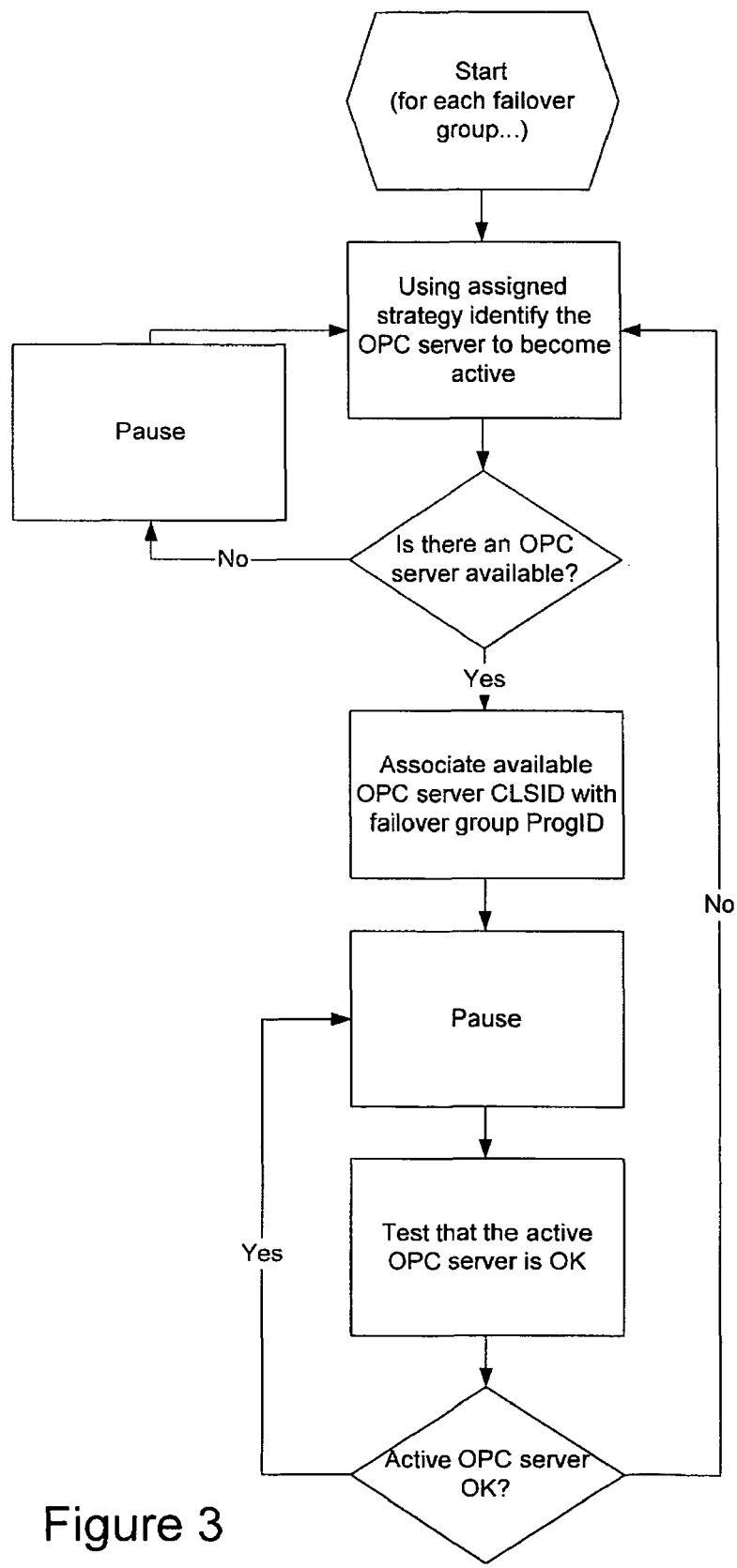
FIG. 3 shows a flow diagram of an OPC Failover process.

Referring now to FIG. 3, this shows a flow diagram of an OPC Failover process. Referring to the labelling of the steps in FIG. 3, the process operates as follows:

Start (for each failover group): The OPC Failover service begins execution and for each currently configured failover group performs all the following actions.

Using assigned strategy identify the OPC server to become active: The OPC Failover service tests the state of each OPC server that belongs to the failover group. The first found to be available is identified.

Is there an OPC server available?: The OPC Failover service checks that there is an OPC server available.

Pause: The OPC Failover service pauses execution.

Associate available OPC server CLSID with the failover group ProgID: The OPC Failover service modifies various Microsoft Registry settings in order to fully associate the available OPC server CLSID with the failover group ProgID.

This step is important. Any OPC client that converts the failover group ProgID to a CLSID will now be given a new and available OPC server CLSID.

Pause: The OPC Failover service pauses execution.

Test that the active OPC server is OK: The OPC Failover service performs various tests to establish the state of the currently assigned active OPC server.

Active OPC server OK?: The OPC Failover service decides if the currently active OPC server is OK. If the active OPC server is OK the OPC Failover service pauses. If the active OPC server is not OK the OPC Failover service begins the process of establishing an alternate OPC server to become active.

Referring to FIG. 4, this shows screenshots from an OPC Failover Manager which may be incorporated within OPC Failover software 20 of FIG. 1, or which may be implemented as a separate module. The OPC Failover Manager enables a user to enter parameters which are stored and used in the procedures of FIGS. 2 and 3.

The OPC Failover Manager is used to configure and monitor the OPC Failover Service and comprises four tabs, as shown in FIGS. 4a to 4d respectively.

Figure 4A:
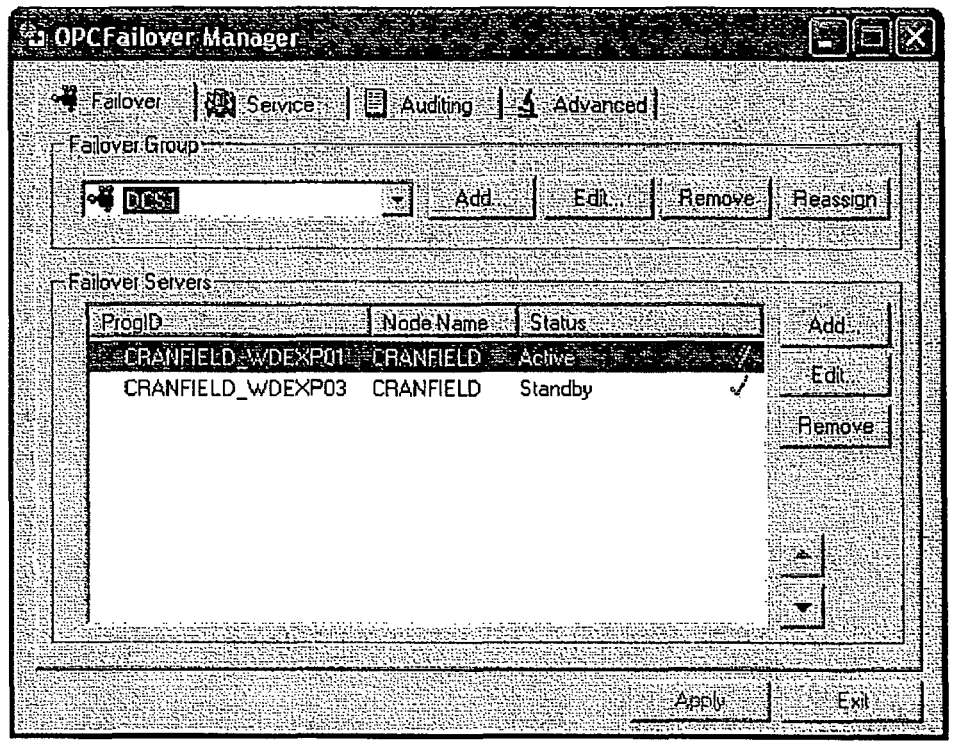
FIGS. 4a to 4d show screenshots of an OPC Failover manager module.

FIG. 4a shows a Failover tab: This is used to define OPC Failover Groups and assign real OPC servers to those groups. It also displays the currently active OPC server for a given failover group.

Figure 4B:
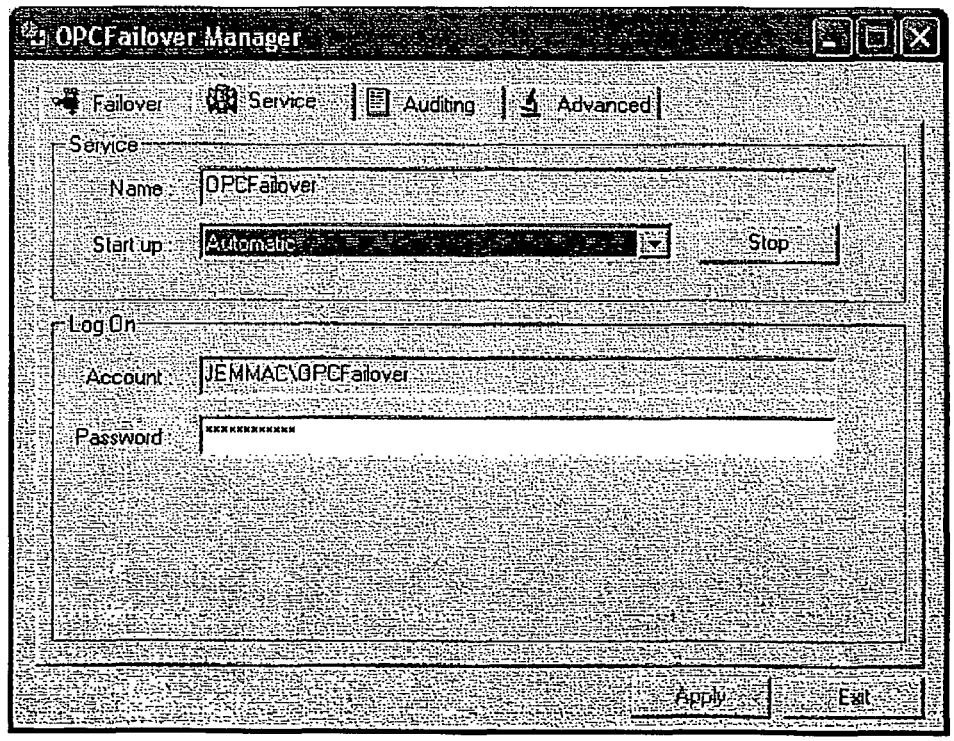

FIG. 4b shows a Service tab: This is used to start and stop the OPC Failover Service and to set the password for the account that the Service runs under.

Figure 4C:
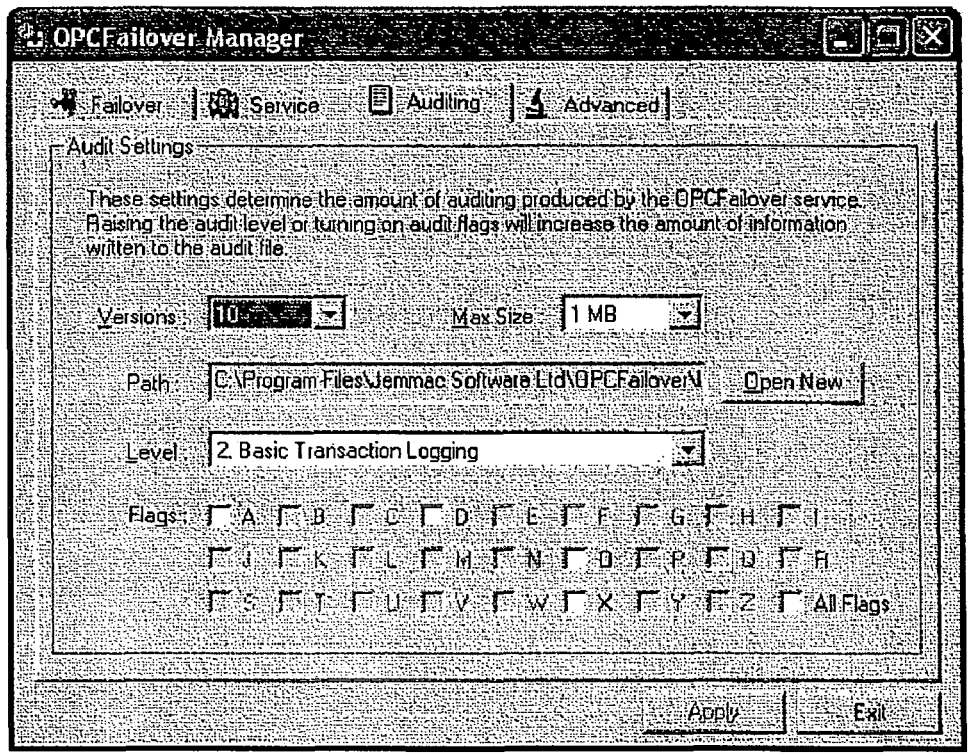

FIG. 4c shows an Auditing tab: This is used to control an optional auditing capability of the OPC Failover Service.

Figure 4D:
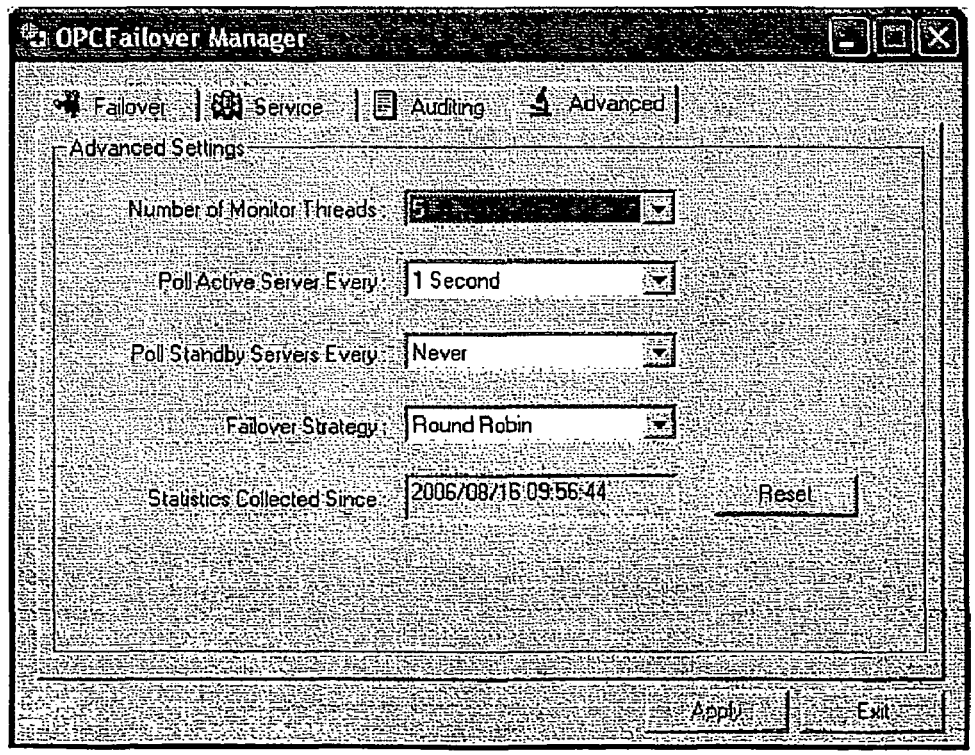

FIG. 4d shows an Advanced Tab: This is used to specify operating parameters of the OPC Failover Service.

Referring in more detail to FIG. 4c, in some preferred embodiments the OPC Failover Service code incorporates an audit function (not explicitly shown in the flow diagram of FIG. 2) which, inter alia, facilitates remote diagnostics and fault finding/correcting. In outline, each significant step performed by the Failover Service may be configured to generate an English-language message which is viewable in an audit log file, describing the step performed and, where appropriate, the outcome.

In more detail, preferred embodiments of the audit code have a plurality of audit levels, and steps within the OPC Failover Service are associated with an audit level so that when the step is performed, if user monitoring at that or a lower level has been selected then details of the step are written to an audit file. For example in an implemented embodiment five audit levels are provided, level 1 being a basic audit level and level 5 being a highly verbose audit level—if, say, audit level 3 is selected then any step at audit level 3, 2 or 1 is reported to the log file: Consider an example where the OPC Failover Services looks at each OPC server in a group to see whether or not it is still functioning correctly. Then an audit level 1 message may simply comprise the fact that the service has been initiated to check the OPC servers, whilst an audit level 2 set of messages may include messages such as "checking Failover group 1", "checking active server 1 in Failover group 1'", "Server 1 verified functioning", and so forth. An example of a level 5 message might be, for example, "data written to registry, success returned".

In some preferred embodiments one or more flags may be associated with messages of a particular type or category, for example a connection attempt. In this way a combination of relatively basic auditing together with detailed auditing of a particular function, such as a connection attempt, may be implemented by selecting one or more of the flag so that flagged messages are written to the audit file in addition to those specified by the overall audit level. This helps to make the audit process more efficient and facilitates a user, in effect, turning up the audit level as desired for trouble shooting. The audit files may be sent to a system maintenance centre and/or made available for remote access for this purpose.

Other functions provided by preferred embodiments of the auditing code are an ability to limit the maximum size of an audit file. Furthermore preferably when this maximum size is exceeded the audit file is closed and a new audit file is opened, the past n audit files being kept where, preferably n is user selectable (number of "versions").

Referring now to FIG. 4d, this shows further settings which may be implemented in embodiments of the system.

The Failover strategy may be selectable between a round robin strategy and a first available strategy—in the former case if there are, say, three OPC servers, A, B and C then if A fails, B is tried next, and if B fails, C is tried next. In the latter case if A fails then B is tried next but if B fails the system tries A again before trying C. The former strategy helps load sharing whereas the latter is more closely akin to the concept of a primary, secondary or standby, and tertiary server.

Preferred embodiments of the OPC Failover Service also enable a user to change when the standby servers are polled. If a user selects "never" then these servers are only polled when the service initialises and on a server fail event; otherwise the standby servers may be polled at a user-selectable predetermined interval, for example 1 second, 10 seconds, 60 seconds and so forth. Similarly the frequency at which the active server is polled is preferably also user-selectable; in this way the load on the server can be controlled. For example if the active server is selected to be polled every second (which is relatively fast but polling is a relatively low overhead process) then the OPC Service may "wake up" every second.

To further assist in efficient operation of the software preferably the number of operational threads of the OPC Failover Service is controlled and, optionally, user-selectable. For example in embodiments one thread provides a control programme and when action is required then this is input to a queue and the first free thread of a predetermined number of worker threads is allocated to the task (although the skilled person will understand that it is the operating system which manages the threads). The value of this can be understood by considering an environment with a large number of failover groups and servers, for example thirty groups and seventy servers. If each job was allocated its own thread then the large number of threads created would constitute a substantial overhead to the operating system in managing and context switching between the threads; by limiting the number of threads for parallel execution regardless of the number of OPC servers and/or groups performance can be improved. The skilled person will understand the implementation of these techniques.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. An architecture for an OPC Failover system, the architecture comprising: a plurality of OPC servers; at least one OPC client; a computer network linking said OPC servers and said OPC client; and an OPC Failover service coupled to said network and not coupled between said OPC client and said OPC servers, said CPC Failover service being configured to monitor at least one of said OPC servers for an error condition and to redirect network communications of said OPC client from one of said servers to another on detection of said error condition; wherein said OPC client has an operating system and wherein said redirection comprises modifying an object identifier in a registry or implementation repository of said operating system; wherein if said OPC Failover service is disabled, said network communication of said OPC client to said OPC servers is unchanged.

2. The architecture as claimed in claim 1 wherein said servers and said client employ distributed component object model (DCOM) communication, and wherein said modifying comprises altering a CLSID associated with a ProgID for a server object for said client to point to said other of said servers.

3. The architecture as claimed in claim 1 wherein said error condition is visible to said the OPC client and said network communications redirection by said OPC Failover service is transparent to said OPC client.

4. The architecture as claimed in claim 1 wherein said OPC Failover service is configured to allow said OPC client to detect said error detection and wherein said OPC client is configured to attempt reconnection to a said OPC server on detection of a said error condition.

5. The architecture as claimed in claim 1 wherein OPC client and said OPC Failover service are implemented on computer hardware with a shared connection to said network.

6. The architecture as claimed in claim 1 wherein said OPC client is coupled to said OPC server by a DCOM link, and wherein said OPC Failover service is configured to modify said DCOM link to redirect said network communications.

7. A manufacturing or industrial plant control system having the OPC Failover architecture of claim 1.

8. A method of providing a failover service for a manufacturing or industrial process control network, said network including a plurality of process control servers and at least one process control client, wherein said network comprises an OPC network, wherein said process control client comprises an OPC client, and wherein one of said process control servers comprises an OPC server, said OPC client of said process control client being coupled to an OPC server in a selected process control server, the method comprising: detecting a failure of said selected process control server; reconfiguring a communications link between said OPC client in said process control client and said selected server to point to a different said process control server; allowing said OPC client in said process control client to detect said failure such that said OPC client in said process control client attempts to reconnect to said selected server; wherein said reconnection attempt is directed to said different server by said reconfiguring of said communications link; wherein said OPC client in said process control client has a connection to a said process control server specified by a name, and wherein said reconfiguring comprises changing an identifier in said OPC client associated with said name from an identifier identifying said selected process control server to an identifier identifying said different process control server; and wherein if said failover service is disabled, said communications link between said OPC client in said process control client and said selected process control server is unaffected.

9. The method as claimed in claim 8 wherein said process control client runs over an operating system and wherein said name and said identifier comprise entries in a registry or repository of said operating system of said process control client.

10. The method as claimed in claim 9 wherein said name and identifier entries comprise DCOM ProgID and CLSID registry entries.

11. The method as claimed in claim 8 wherein said attempt to reconnect comprises re-reading said identifier associated with said name.

12. A non-transitory carrier medium carrying computer readable instructions for controlling a computer system to perform the method of claim 8.

* * * * *

UNITED STATES PATENT AND TRADEMARK OFFICE
CERTIFICATE OF CORRECTION

| | | |
|---|---|---|
| PATENT NO. | : 8,234,384 B2 | Page 1 of 1 |
| APPLICATION NO. | : 11/598307 | |
| DATED | : July 31, 2012 | |
| INVENTOR(S) | : Mark Fisher et al. | |

It is certified that error appears in the above-identified patent and that said Letters Patent is hereby corrected as shown below:

Title Page, Item (73) Assignee: delete "Cranford," and insert --Cranfield--.

Signed and Sealed this
Ninth Day of October, 2012

David J. Kappos
*Director of the United States Patent and Trademark Office*